US008665362B2

(12) United States Patent
Hsueh et al.

(10) Patent No.: US 8,665,362 B2
(45) Date of Patent: Mar. 4, 2014

(54) POSITIONABLE MECHANISM WITH AN OPTICAL IMAGE STABILIZING UNIT

(75) Inventors: Chun-Yu Hsueh, Taichung (TW); Tsung-Tse Chen, Taichung (TW)

(73) Assignee: Asia Optical International, Ltd., Tortola, B.V.I. (GB)

( * ) Notice: Subject to any disclaimer, the term of this patent is extended or adjusted under 35 U.S.C. 154(b) by 37 days.

(21) Appl. No.: 13/611,231

(22) Filed: Sep. 12, 2012

(65) Prior Publication Data

US 2013/0176446 A1    Jul. 11, 2013

(30) Foreign Application Priority Data

Jan. 11, 2012  (TW) .............................. 101101092 A

(51) Int. Cl.
*H04N 5/225* (2006.01)
*H04N 5/228* (2006.01)

(52) U.S. Cl.
USPC .................. 348/373; 348/208.4; 348/208.99; 348/208.7

(58) Field of Classification Search
USPC .............. 348/373, 205, 208.4, 208.99, 208.7, 348/E05.046, 374, E13.056; 396/13, 55, 396/419, 421; 354/70; 359/554
See application file for complete search history.

(56) References Cited

U.S. PATENT DOCUMENTS

| 7,586,519 | B2 * | 9/2009 | Nomura et al. | ............ 348/208.4 |
| 7,973,822 | B2 * | 7/2011 | Kawai et al. | ................ 348/208.7 |
| 2007/0182825 | A1 * | 8/2007 | Nomura et al. | ........... 348/208.99 |
| 2009/0086037 | A1 | 4/2009 | Chang et al. | |
| 2010/0302437 | A1 * | 12/2010 | Kobayashi | ..................... 348/374 |

FOREIGN PATENT DOCUMENTS

| TW | 201003116 | 1/2010 |
| TW | 201030370 | 8/2010 |

* cited by examiner

*Primary Examiner* — Nhan T Tran
*Assistant Examiner* — Chan Nguyen
(74) *Attorney, Agent, or Firm* — Trop Pruner & Hu, P.C.

(57) ABSTRACT

A positionable mechanism includes a frame unit, an OIS unit, and a positioning unit that are mounted on a base unit. The frame unit is retractable with respect to the base unit between a storage position and a working position. The positioning unit is movable with respect to the OIS unit between an abutting position and a releasing position, and is subjected to a restoring force. When the frame unit is at the storage position, a pressing part of the frame unit presses the positioning unit to the abutting position where the positioning unit abuts against a movable carrier of the OIS unit. When the frame unit is at the working position, the positioning unit is restored to the releasing position and releases the movable carrier.

11 Claims, 6 Drawing Sheets

POSITIONABLE MECHANISM WITH AN OPTICAL IMAGE STABILIZING UNIT

CROSS-REFERENCE TO RELATED APPLICATION

This application claims priority of Taiwanese Application No. 101101092, filed on Jan. 11, 2012.

BACKGROUND OF THE INVENTION

1. Field of the Invention

The present invention relates to a camera, more particularly to a positionable mechanism with an optical image stabilizing unit for a camera.

2. Description of the Related Art

Generally, an optical image stabilizing (OIS) unit of a camera includes a movable carrier used to carry an optical element, such as an optical sensor, to move along a horizontal direction so as to compensate image blurring attributed to shaking of the hand. However, the OIS unit may wobble and generate noise when the camera is in a shutdown state.

In U.S. Patent Application Pub. No. 2009/0086037 and Taiwanese Patent Application Pub. No. 201003116, a conventional positioning unit is in a form of a pressing mechanism driven by a driving unit to position the OIS unit when the camera is in a shutdown state. However, the pressing mechanism requires an additional driving unit and the structure thereof is relatively complicated such that manufacturing cost thereof is relatively high.

Moreover, in Taiwanese Patent Application Pub. No. 201030370, another conventional positioning unit includes a pair of springs disposed between the OIS unit and a base unit as to alleviate vibration of the OIS unit. Nevertheless, the positioning unit is also structurally complicated since it is provided with the springs, and the springs may cause undesired hindrance against movement of the OIS unit.

SUMMARY OF THE INVENTION

Therefore, an object of the present invention is to provide a positionable mechanism with an optical image stabilizing unit and having a relatively simple structure.

Accordingly, a positionable mechanism of this invention comprises a base unit, a frame unit, an optical image stabilizing (OIS) unit, and a positioning unit.

The frame unit is mounted on the base unit, is retractable with respect to the base unit between a storage position and a working position, and includes a pressing part. The OIS unit is mounted on the base unit, and includes a movable carrier that includes an orientation part facing the frame unit, an optical element that is mounted on the movable carrier, and a driving element that is operable to drive the movable carrier to move with respect to the base unit. The positioning unit includes a main body that is disposed at the base unit, that is movable with respect to the movable carrier between an abutting position and a releasing position, and that is subjected to a restoring force forward the releasing position.

When the frame unit is at the storage position, the pressing part of the frame unit presses the main body of the positioning unit to the abutting position where the positioning unit abuts against the orientation part of the movable carrier so as to position the movable carrier. When the frame unit is at the working position, the main body is restored to the releasing position due to the restoring force and the positioning unit releases the movable carrier.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
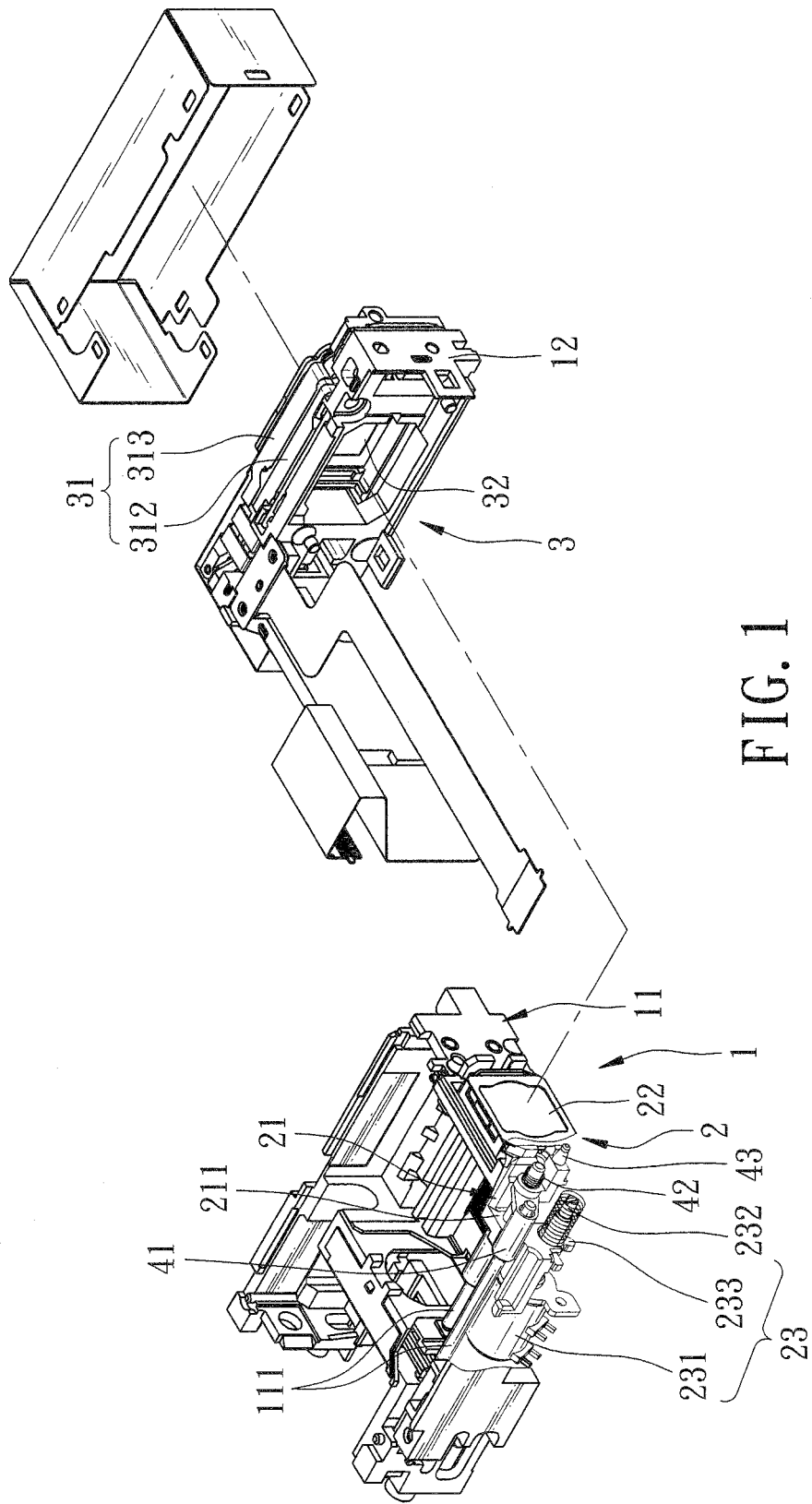
FIG. 1 is an exploded perspective view of a first preferred embodiment of a positionable mechanism according to the present invention.

Before the present invention is described in greater detail, it should be noted that like elements are denoted by the same reference numerals throughout the disclosure.

Figure 2:
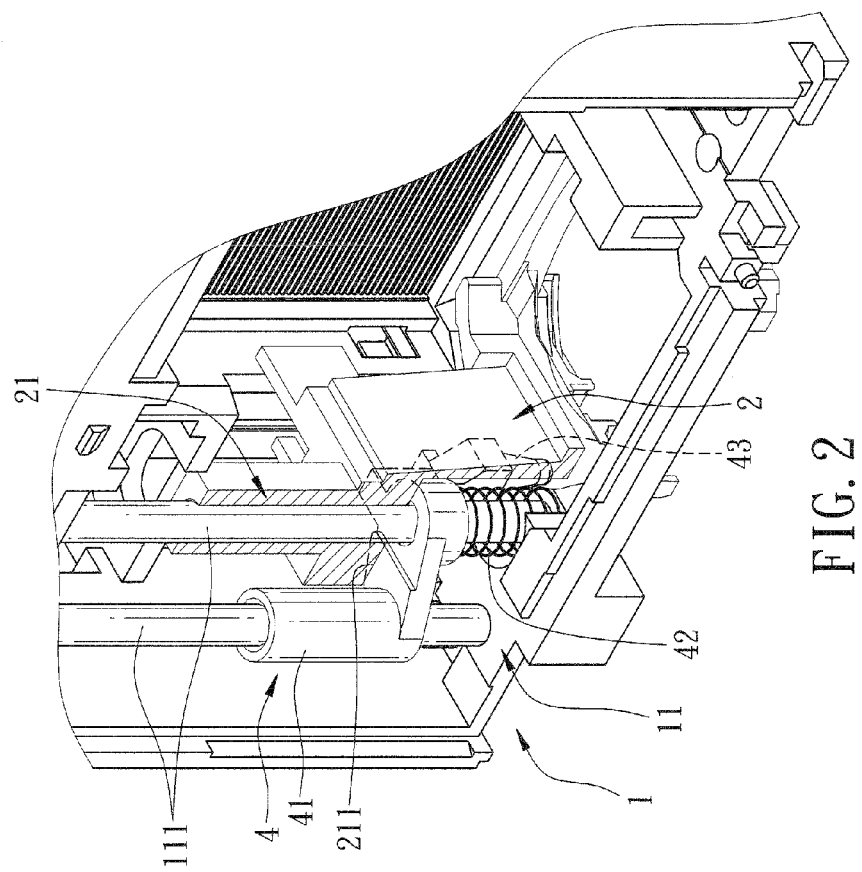
FIG. 2 is an enlarged fragmentary perspective view of the positionable mechanism for illustrating engagement among a frame base of a base unit, a retractable carrier of a frame unit and a positioning unit.
Figure 3:
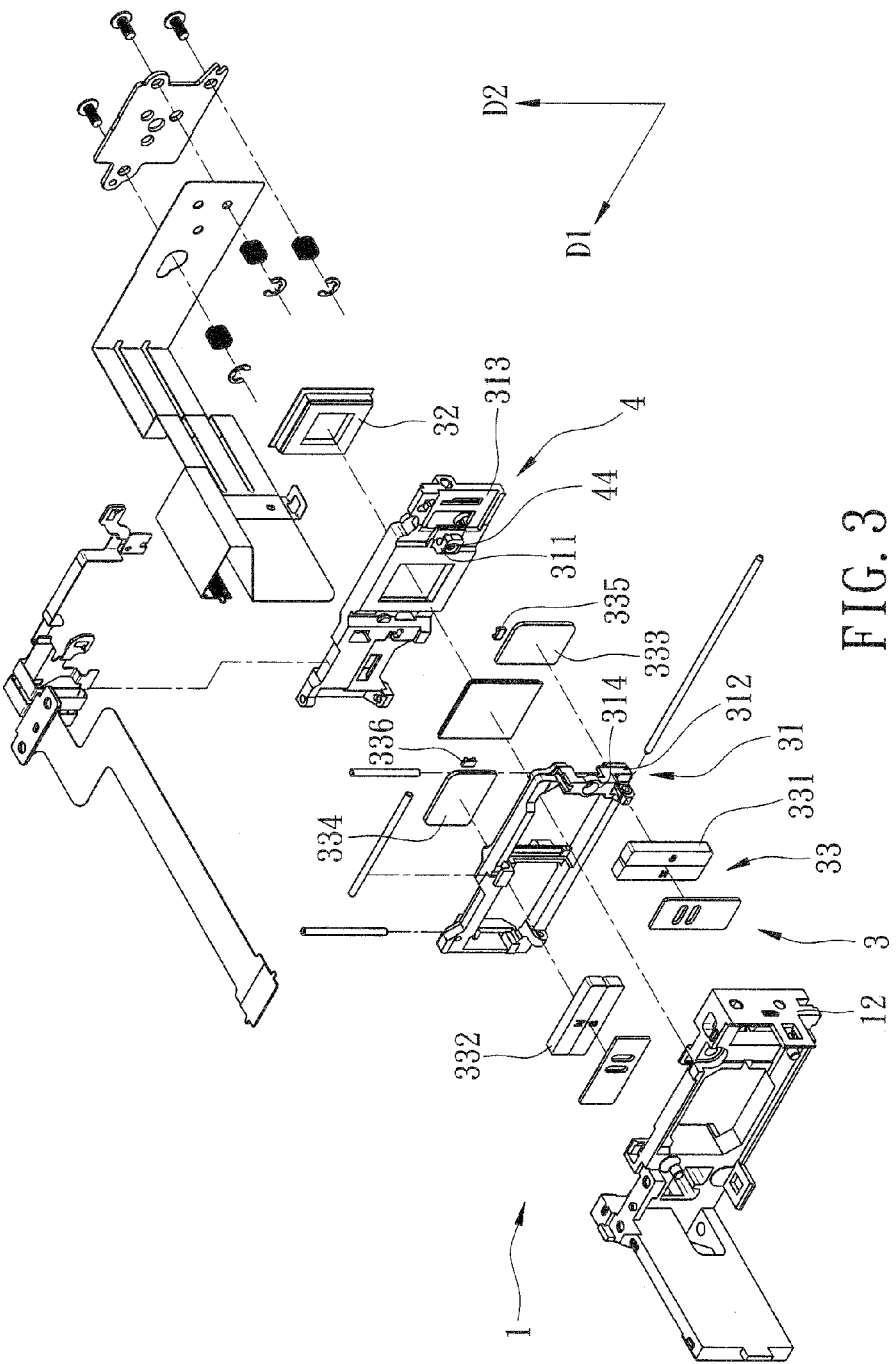
FIG. 3 is an exploded perspective view for illustrating an optical image stabilizing (OIS) unit mounted on an OIS base of the base unit.

Referring to FIGS. 1 to 3, a first preferred embodiment of a positionable mechanism of this invention is adapted to be installed in a camera (not shown), and includes a base unit 1, a frame unit 2, an optical image stabilizing (OIS) unit 3, and a positioning unit 4.

The base unit 1 includes a frame base 11 and an OIS base 12 connected to each other. The frame base 11 includes a bearing set 111. The frame unit 2 is mounted on and is retractable with respect to the frame base 11, and the OIS unit 3 is movable with respect to the OIS base 12.

The frame unit 2 is retractable with respect to the frame base 11 of the base unit 1 between a storage position and a working position, and includes a retractable carrier 21 sleeved on the bearing set 111 of the frame base 11, a lens 22 disposed on the retractable carrier 21, and a driving component 23 operable to drive the retractable carrier 21 to move with respect to the frame base 11 along the bearing set 111. The driving component 23 includes a motor 231, a screw rod 232 driven by the motor 231, and a nut element 233 disposed at the retractable carrier 21 and driven by the screw rod 232 to move along the screw rod 232 so as to extend and retract the retractable carrier 21. The retractable carrier 21 has a pressing part 211 confronting the positioning unit 4.

It should be noted that the manner for driving movement of the lens 22 together with the retractable carrier 21 is not limited to the disclosure of this embodiment. For instance, the driving component 23 may be a linear motor or a voice coil motor driven electromagnetically. In practice, the lens 22 of the frame unit 2 may be used for focusing or zooming.

The OIS unit 3 is mounted on the OIS base 12 of the base unit 1, and includes a movable carrier 31, an optical element 32 that is mounted on the movable carrier 31, and a driving element 33 that is operable to drive the movable carrier 31 to move with respect to the OIS base 12 of the base unit 1. In particular, the movable carrier 31 of the OIS unit 3 includes a first moving frame 312 that is movable with respect to the OIS base 12 of the base unit 1 along a first direction (D1), and a second moving frame 313 that is movable with respect to the first moving frame 312 along a second direction (D2) transverse to the first direction (D1) and that is provided with an orientation part 311 corresponding to the frame unit 2 and the positioning unit 4. In this embodiment, the first moving frame 312 is disposed on the OIS frame 12, and the second moving frame 313 is disposed on the first moving frame 313. Further, the first moving frame 312 of the movable carrier 31 is formed with a through hole 314. In this embodiment, the optical element 32 is a charge-coupled device (CCD).

The driving element 33 includes a first magnet 331 and a second magnet 332 mounted on the OIS base 12 of the base unit 1, a first coil 333 and a second coil 334 mounted on the second moving frame 313, and a first Hall element 335 and a second Hall element 336 mounted on the second moving frame 313. The first coil 333 and the second coil 334 are configured to generate induced magnetic field so as to move the first magnet 331 and the second magnet 332. The first Hall element 335 and the second Hall element 336 are used for detecting positions of the first magnet 331 and the second magnet 332, respectively.

It is worth mentioning that, the first moving frame 312 and the second moving frame 313 may as well be formed integrally, for example, a movable retaining component disclosed in Taiwan Patent Application Pub. No. 201030370 (with a reference numeral 110). Further, the driving element 33 may adopt a driving scheme other than magnetic force, such as a motor. Since such modification and variation of the OIS unit 3 are well known to those skilled in the art, further discussion thereof will be omitted hereinafter for the sake of brevity.

Figure 4:
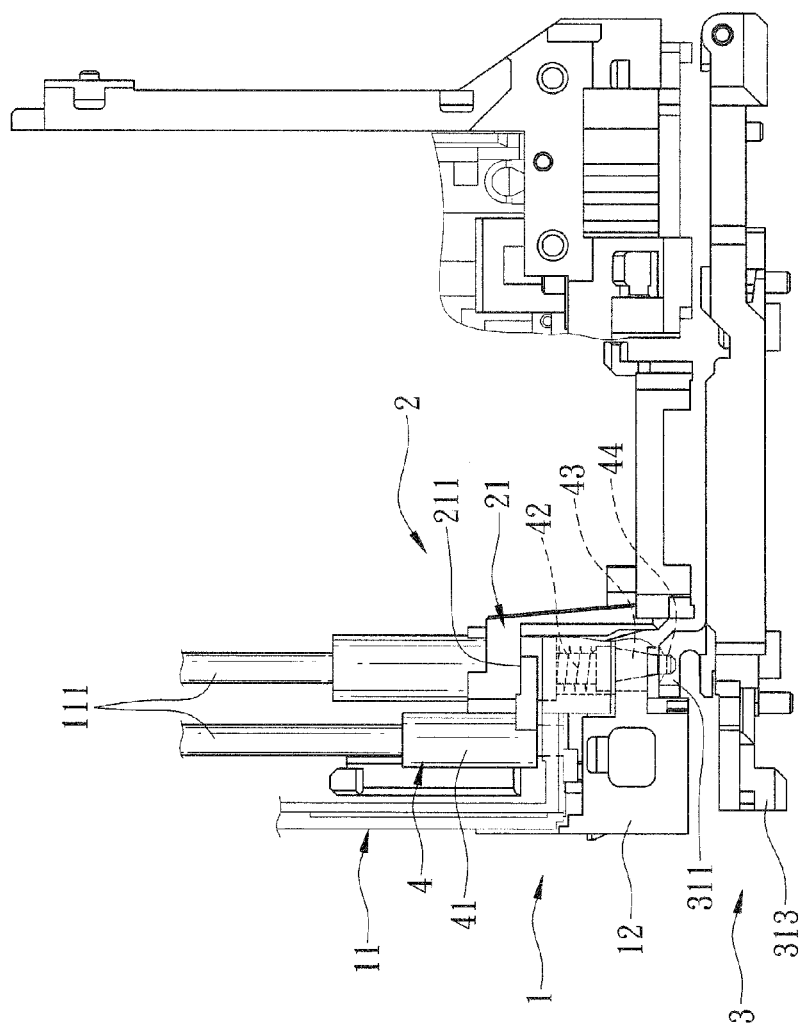
FIG. 4 is a fragmentary side view for illustrating the frame unit at a storage position.
Figure 5:
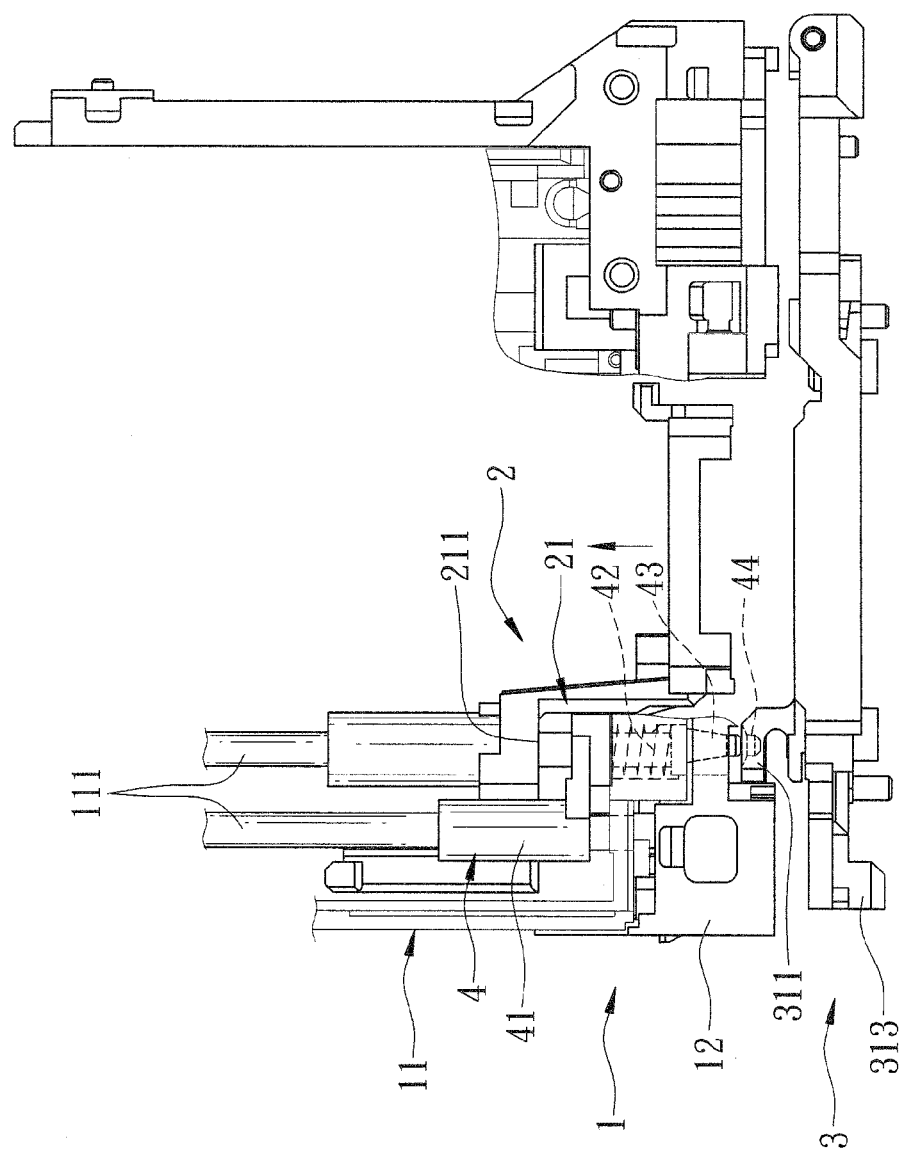
FIG. 5 is a fragmentary side view for illustrating the frame unit at a working position.

The positioning unit 4 includes a main body 41 sleeved on the bearing set 111 of the base unit 1, a resilient component 42 sleeved on the bearing set 111 between the main body 41 and the frame base 11, a positioning pin 43 that protrudes from the main body 41, and a positioning recess 44 that is disposed at the orientation part 311 of the movable carrier 31 and registered with the positioning pin 43. The positioning pin 43 and the positioning recess 44 are registered with the through hole 314 in the first moving frame 312 of the movable carrier 31. The main body 41 is movable relative to the movable carrier 31 of the OIS unit 3 between an abutting position (as shown in FIG. 4) and a releasing position (as shown in FIG. 5), and is subjected to a restoring force toward the releasing position. In the abutting position, the resilient component 42 is configured to provide the restoring force to the main body 41 for restoring the main body 41 to the releasing position. In this embodiment, the resilient component 42 is a restoring spring. It should be noted that, the restoring force to restore the main body 41 to the releasing position may as well be provided by other means such as a magnetic force, etc.

Referring to FIGS. 4 and 5, upon turning on the camera, the frame unit 2 is switched from the storage position to the working position. Thus, the main body 41 is restored to the releasing position due to the restoring force so as to release the movable carrier 31.

When the frame unit 2 is switched from the working position to the storage position, the retractable carrier 21 of the frame unit 2 is moved toward the main body 41 of the positioning unit 4 such that the pressing part 211 presses the main body 41 to the abutting position (as shown in FIG. 4). At this time, the positioning pin 43 is received in the positioning recess 44 and abuts against the orientation part 311 of the movable carrier 31 so as to position the movable carrier 31 of the OIS unit 3. As a result, the OIS unit 3 is prevented from wobbling and will not create noise when the camera is at a shutdown state, i.e., the frame unit 2 is at the storage position.

It should be noted that the first moving frame 312 is omitted in FIGS. 4 and 5 for the sake of clarity.

It is worth mentioning that, the main body 41 may as well be disposed integrally at an elastic cantilever of the frame base 11 so as to be resiliently restorable to the releasing position. In other embodiments, the positioning pin 43 may protrude from the orientation part 311 and the positioning recess 44 may be disposed at the main body 41. Moreover, the positioning unit 4 may only include the positioning pin 43 and may omit the positioning recess 44.

Figure 6:
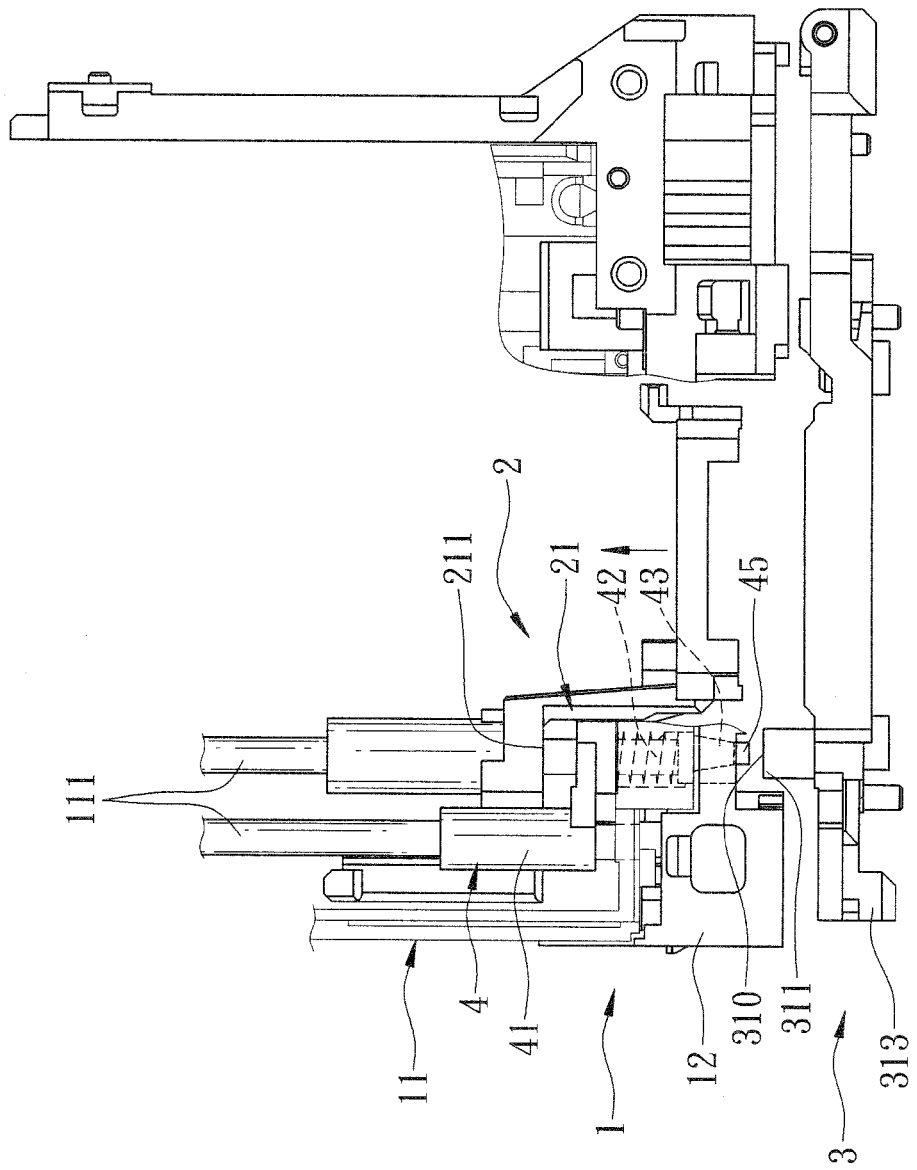
FIG. 6 is a fragmentary side view of a second preferred embodiment of a positionable mechanism according to the present invention.

Referring to FIG. 6, a second preferred embodiment of a positionable mechanism of this invention is shown to be similar to the first preferred embodiment. In the second preferred embodiment, an elastic component 45 is disposed at one of the main body 41 of the positioning unit 4 and the orientation part 311 of the movable carrier 31 of the OIS unit 3, and abuts against another one of the main body 41 and the orientation part 311 when the main body 41 is at the abutting position. In this embodiment, the elastic component 45 is disposed at the main body 41 and is made of a material with relatively high damping, such as rubber, silicone, foam, etc. Moreover, the positioning recess 44 of the positioning unit 4 is omitted, and the orientation part 311 has a planar surface 310 facing the elastic component 45 and abutting against the elastic component 45 when the main body 41 is at the abutting position. By virtue of the elastic component 45, noise attributed to the OIS unit 3 is reduced when the frame unit 2 is at the storage position.

To sum up, by virtue of the pressing part 211 of the retractable carrier 21 of the frame unit 2 and the resilient component 42 of the positioning unit 4, the main body 41 of the positioning unit 4 is movable between the abutting position and the releasing position. The pressing part 211 of the retractable carrier 21 is driven to press the main body 41 to the abutting position, where the positioning pin 43 of the positioning unit 4 abuts against the orientation part 311 of the OIS unit 3 so as to position the OIS unit 3. In such a manner, the structure of the positioning unit 4 is relatively simple to reduce costs.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A positionable mechanism comprising:
a base unit;
a frame unit mounted on said base unit, retractable with respect to said base unit between a storage position and a working position, and including a pressing part;
an optical image stabilizing (OIS) unit mounted on said base unit, and including a movable carrier that includes an orientation part facing said frame unit, an optical element that is mounted on said movable carrier, and a driving element that is operable to drive said movable carrier to move with respect to said base unit; and
a positioning unit including a main body that is disposed at said base unit, that is movable with respect to said movable carrier between an abutting position and a releasing position, and that is subjected to a restoring force toward the releasing position;
wherein, when said frame unit is at the storage position, said pressing part of said frame unit presses said main body of said positioning unit to the abutting position where said positioning unit abuts against said orientation part of said movable carrier so as to position said movable carrier;

wherein, when said frame unit is at the working position, said main body is restored to the releasing position due to the restoring force and said positioning unit releases said movable carrier.

2. The positionable mechanism as claimed in claim 1, wherein said base unit includes a frame base including a bearing set, on which said main body of said positioning unit is sleeved, and said positioning unit further includes a resilient component sleeved on said bearing set between said main body and said frame base.

3. The positionable mechanism as claimed in claim 1, wherein said positioning unit further includes a positioning pin that protrudes from one of said main body and said orientation part.

4. The positionable mechanism as claimed in claim 3, wherein said positioning unit further includes a positioning recess that is disposed at another one of said main body and said orientation part and that receives said positioning pin therein when said frame unit is at the storage position and said main body is at the abutting position.

5. The positionable mechanism as claimed in claim 4, wherein said positioning pin is disposed at said main body and said positioning recess is disposed at said orientation part.

6. The positionable mechanism as claimed in claim 1, wherein said base unit includes a frame base and an OIS base connected to each other, said frame unit being mounted on and retractable with respect to said frame base, said OIS unit being movable with respect to said OIS base.

7. The positionable mechanism as claimed in claim 1, wherein:

said movable carrier of said OIS unit includes a first moving frame that is movable with respect to said base unit along a first direction, and a second moving frame that is movable with respect to said first moving frame along a second direction transverse to the first direction and that is provided with said orientation part; and said driving element includes a pair of magnets mounted on said base unit, a pair of coils mounted on said second moving frame, and a pair of Hall elements mounted on said second moving frame.

8. The positionable mechanism as claimed in claim 6, wherein said frame unit further includes a retractable carrier, a lens disposed on said retractable carrier, and a driving component operable to drive said retractable carrier to extend and retract with respect to said frame base.

9. The positionable mechanism as claimed in claim 8, wherein said driving component includes a motor, a screw rod driven by said motor, and a nut element disposed at said retractable carrier and driven by said screw rod.

10. The positionable mechanism as claimed in claim 1, further comprising an elastic component disposed at one of said main body and said orientation part of said movable carrier of said OIS unit, and abutting against another one of said main body and said orientation part when said frame unit is at the storage position and said main body is at the abutting position.

11. The positionable mechanism as claimed in claim 10, wherein said elastic component is disposed at said main body.

* * * * *